INVENTORS
PAUL DAVIDOVITS
ROBERT NOVICK
NORMAN KNABLE
BY *Harry E. Aine*
ATTORNEY

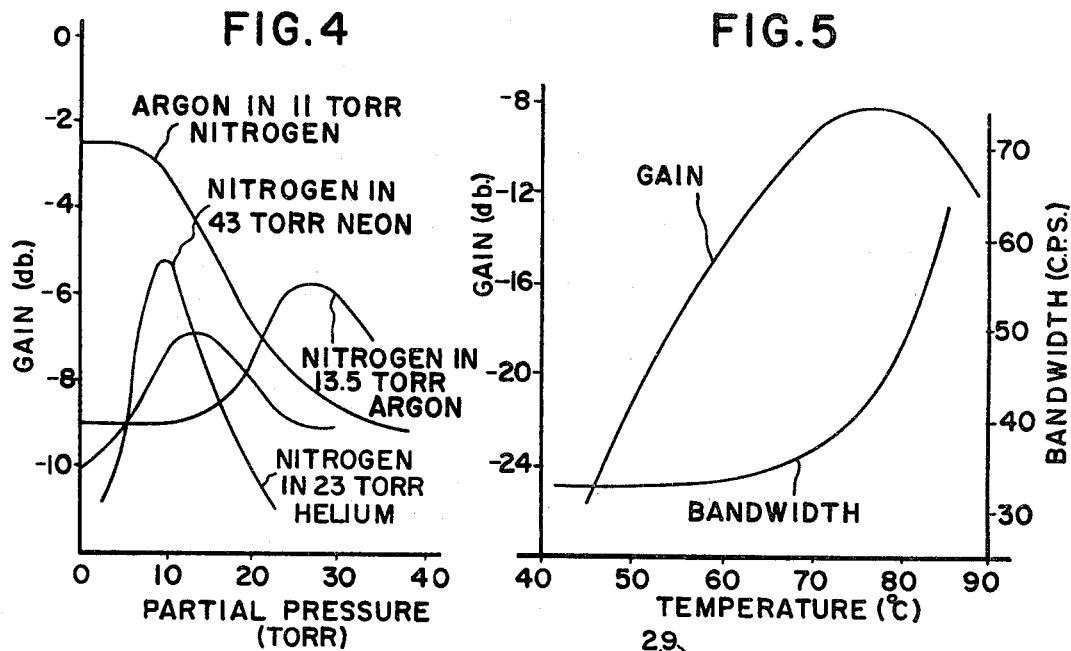
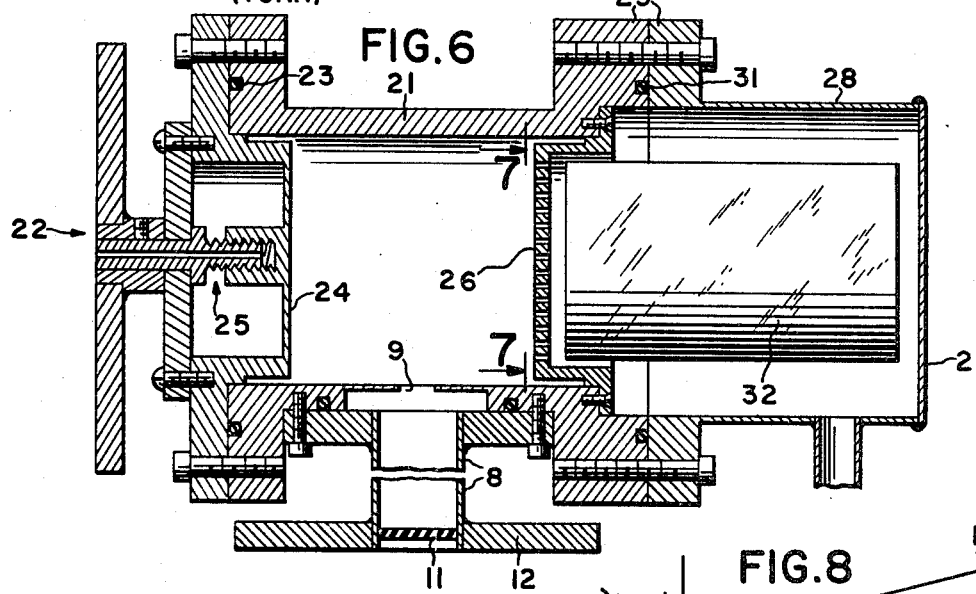
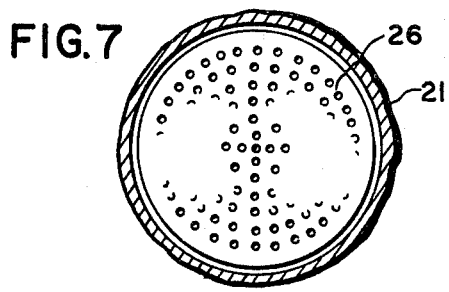
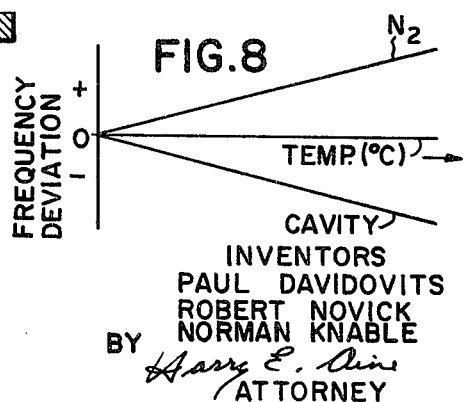

United States Patent Office 3,390,350
Patented June 25, 1968

3,390,350
ATOMIC RESONANCE APPARATUS UTILIZING
AN IMPROVED BUFFER GAS CELL
Paul Davidovits, New York, Robert Novick, Hartsdale, and Norman Knable, New York, N.Y., assignors to Varian Associates, Palo Alto, Calif., a corporation of California
Filed Oct. 5, 1964, Ser. No. 401,731
9 Claims. (Cl. 331—94)

ABSTRACT OF THE DISCLOSURE

An atomic resonance maser is disclosed. The maser includes a cavity resonator preferably dimensioned for resonance in a circular electric mode and containing therewithin an ensemble of gaseous atoms such as alkali vapor in a buffer gas. One wall of the cavity resonator includes a light transmissive window for illuminating the alkali vapor from an external light source for optically pumping the vapor. In a preferred embodiment, the buffer gas includes a quenching gas constituent, such as nitrogen, at a partial pressure of 5–20 torr, whereby the gain of the maser apparatus is improved. In addition, the cavity resonator preferably has a temperature dependent frequency shift of an opposite sense to the temperature dependent frequency shift of the resonance frequency of the alkali vapor in the buffer gas medium, whereby the resonance frequency shift of the cavity is compensated by the resonance frequency shift of the atomic vapor. Improved gain is also obtained for the atomic resonance vapor by reducing the total unidirectional magnetic field over the ensemble of gaseous vapor to less than 100 microgauss, whereby the field dependent resonant lines are collapsed into the field independent resonant lines to permit more of the energy states of the atomic vapor to enter into the desired resonance transistion. A sufficient amount of atomic vapor is provided within the cavity and the cavity is dimensioned to be of a sufficient size and to have a sufficiently high Q, such that spontaneous emission of radiation from the upper energy levels to the lower energy levels of the atom results in producing a self-sustaining coherent emission of radiation characteristic of an atomic maser. A sample of the maser oscillations, produced within the cavity, is coupled out of the cavity to a suitable utilization device, such as an atomic clock, frequency standard or the like.

---

Heretofore, attempts have been made to obtain continuous maser oscillations from such a gas cell atom resonance system utilizing vapors of the alkali metals as the atomic resonance medium. However, this work has not been successful because the parameters determining the conditions of self-sustaining oscillation have not been sufficiently optimized to obtain continuous self-sustaining microwave oscillation. For example, the overpopulation of the energy state determining the microwave transition has not been sufficient great, in view of the realizable Q of the cavity coupled to the transition, to sustain oscillation.

In a preferred embodiment of the present invention it has been found that the overpopulation of the atomic energy states, determinative of the microwave transition of the atomic resonance system, can be substantially increased by the use of a certain critical pressure of a quenching gas constituent in the buffer gas of the atomic resonance cell. This critical pressure of the quenching gas, such as, for example, nitrogen prevents optical reradiation induced depopulation of the overpopulated high energy sublevel of the ground state of the atomic ensemble by quenching such undesired reradiation. Thus, the quenching gas substantially enhances the gain of the atomic resonance ensemble and permits maser oscillations, in the case of a maser apparatus, or an improved signal to noise ratio in a non-masing apparatus such as, for example, an optically pumped and monitored frequency standard of the type described in U.S. patent application No. 129,874 filed Aug. 7, 1961, and assigned to the same assignee as the present invention, now abandoned in favor of U.S. patent application No. 448,496, filed Apr. 16, 1965.

The principal object of the present invention is the provision of an improved gas cell atomic resonance apparatus having increased signal to noise ratio or providing increased gain for maser oscillation, such improved apparatus being particularly useful, for example, as a frequency standard or magnetometer.

One feature of the present invention is the provision of a quenching gas constituent in the buffer gas of the gas cell of the atomic resonance ensemble, such quenching gas being provided within a certain optimum critical pressure range to substantially increase the gain of the atomic resonance ensemble whereby maser oscillation may be obtained or improved signal to noise ratio provided.

Another feature of the present invention is the same as the preceding feature wherein the quenching buffer gas constituent is nitrogen and the critical pressure range in between 5 and 20 torr at 20° C.

Another feature of the present invention is the provision of an atomic resonance gas cell having a temperature coefficient of the buffer gas which is opposite to the temperature coefficient of the microwave cavity enveloping and interacting with the gas to yield a composite cavity and gas cell having a microwave atomic resonance frequency relatively insensitive to temperature shifts of the environment.

Other features and advantages of the present invention will become more apparent after a perusal of the following specification taken in conjunction with the accompanying drawing wherein:

FIG. 4 is a graph of gain versus buffer gas partial pressure for various mixtures of nitrogen and other buffer gases;

FIG. 5 is a graph of gain and bandwidth versus temperature of the atomic gas cell;

FIG. 6 is a longitudinal sectional view of a complete cavity resonator and gas cell incorporating features of the present invention;

FIG. 7 is an enlarged cross-sectional view of the portion of the structure of FIG. 6 taken along line 7—7 in the direction of the arrows;

FIG. 8 is a plot of frequency deviation versus temperature of the buffer gas cell and cavity resonator structure.

Figure 1:
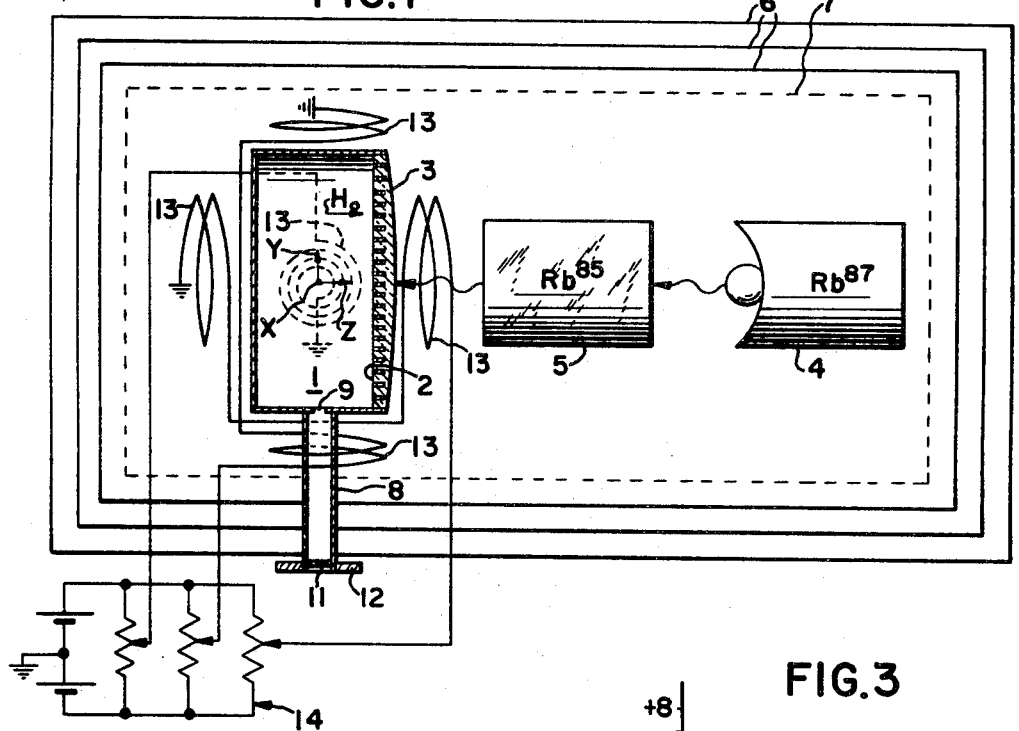
FIG. 1 is a schematic longitudinal sectional view of at atomic maser utilizing features of the present invention.

Referring now to FIG. 1, there is shown a rubidium maser apparatus employing features of the present invention. More specifically, a cavity resonator 1, dimensioned for operation on the $TE_{0,2,1}$ mode, has deposited therein approximately 2 mg. of pure $Rb^{87}$ metal at room temperature. The cavity is then filled with a suitable buffer gas, such as a pure nitrogen gas at a pressure of preferably about 11 torr at room temperature. Nitrogen as a buffer gas constituent has particular advantages which are more fully described below. In operation the cavity is heated to about 60° C. at which temperature the $Rb^{87}$ metal vaporizes and mixes with the buffer gas.

One end wall of the cavity 1 is perforated to admit resonance radiation light for optically pumping the ensemble of rubidium atoms to a higher energy state. The optical pumping mechanism will be more fully described below with regard to FIGS. 2 and 3. The perforated end wall 2 of the cavity resonator 1 has a suitable light transparency, as of, for example, 50%. A glass window 3 is sealed over the perforated end wall 2 to allow the cavity resonator 1 to serve also as the gas cell. Conventional non-magnetic glass to metal sealing techniques are used for sealing the window.

An $Rb^{87}$ lamp 4, such as, for example, the Varian X-49-609 lamp is disposed such as to project its light beam into the cavity 1 through the perforated end wall 2. An $Rb^{85}$ filter 5 is disposed in the light path between the cavity 1 and the $Rb^{87}$ lamp 4 for filtering out certain undesired spectral lines of the $Rb^{87}$ lamp in order to permit optical pumping of the $Rb^{87}$ atoms within the cavity 1. The optical pumping depopulates the $F=1$ sublevel of the ground state of the $Rb^{87}$ atoms by exciting transitions of the atom to higher excited energy states from which the atoms decay with equal probability to the $F=1$ and $F=2$ levels of the ground states, but since the $F=1$ ground state level is continuously being depopulated by the optical pumping there results an overpopulation of the $F=2$ level of the ground state from which stimulated coherent emission of radiation may be obtained.

A plurality of magnetic shields 6, as of, for example, Moly Permalloy closed cylinders envelop the cavity 1 to reduce the magnitude of extraneously produced magnetic fields. In addition, an oven 7 is provided internally of the shields 6 to maintain the various elements of the apparatus, including the gas cell, at a preferred operating temperature, as of, for example, 60° C.

A microwave output terminal is formed by a section of waveguide 8 coupled to the $TE_{0,n}$ mode of the cavity 1 via iris 9. A mica window 11 is sealed in a gas tight manner, across the waveguide 8 at an output flange 12. Three quadraturely disposed, i.e. along the $x$, $y$ and $z$ axes, aiding connected Helmholtz coil pairs 13 surround the cavity 1 and are each excited from an individually adjustable D.C. current source 14. The coil pairs 13 serve to control the residual D.C. magnetic field over the ensemble of gaseous atoms within the cavity 1 to any desired direction and magnitude. Preferably the coils 13 are adjusted to provide a small uniform polarizing magnetic field $H_0$, as of 1 milligauss, directed axially of the cavity 1.

In operation, the $Rb^{87}$ lamp 4 and filter 5 form a source of optical radiation which serves to overpopulate the $F=2$ hyperfine sublevel of the ground state of the $Rb^{87}$ atoms forming the atomic resonance ensemble within the cavity 1. The cavity resonator 1 is tuned to the ground state $(F=2, M=0 \rightarrow F=1, M=0)$, hyperfine transition frequency of approximately 6,835 mc. With optimum adjustment of the coils 13, pumping light intensity, tuning of the cavity, and temperatures of the filter 5 and cavity 1, the gain of the atomic resonance ensemble is greater than 1 such that random microwave transitions from the $F=2$ hyperfine energy state to the $F=1$ hyperfine energy state excite the cavity resonator in such a way that the fields of the cavity interact back on the ensemble of gaseous atoms to produce coherent self-sustaining continuous emission of radiation therefrom at the hyperfine resonance frequency. A portion of the microwave resonance signal is then coupled out of the cavity 1 via the output terminal and fed to a suitable utilization device.

As a maser oscillator operating on a field independent transition, the apparatus of FIG. 1 provides an extremely simple secondary frequency standard with unprecedented possible short term stability of one part in $10^{14}$. In addition, the maser oscillator will provide long term stability on the order of one part in $10^{12}$.

The maser oscillator of FIG. 1 may be operated in more than one substantially field independent mode of operation. In a preferred mode of operation, stimulated emission of radiation is obtained from a pure hyperfine transition, that is, the Zeeman sublevels are separated in frequency away from the desired $(F=2, m=0 \rightarrow F=1, m=0)$ transition such that substantially only the desired field independent transition is observed. Generally, this separation of the Zeeman sublevels is obtained if the ensemble of $Rb^{87}$ atoms is immersed in a polarizing magnetic field $H_0$ of greater than 100 microgauss. However, in this mode of operation, the field dependent hyperfine transitions do not contribute to the field independent hyperfine transition and therefore the gain of the ensemble of gaseous atoms is less than that obtained if the field $H_0$ is reduced to less than 100 microgauss. Other parameters determining the maser conditions must be enhanced to obtain the maser oscillation. More specifically, the temperature of the ensemble should be optimized to improve the gain and the cavity Q can be increased by going to a larger volume cavity operating in one of the higher smoke-ring modes to enhance the maser conditions.

The second substantially field independent mode of operation of the maser oscillator of FIG. 1 is one in which the shields 6 and coils 13 serve to reduce the magnetic field over the ensemble of gaseous atoms within the cavity 1 to less than 100 microgauss such that the Zeeman sublevels combine with the desired $(F=2, m=0 \rightarrow F=1, m=0)$ transition, thereby increasing the gain of the ensemble. This combination of the Zeeman sublevels, while tending to increase the gain of the total ensemble, broadens the resonance line and tends to make the output subject to fluctuations in the magnetic environment. Thus, for the purposes of a frequency standard or atomic clock, the first above-mentioned high field independent mode of operation is preferred.

Figure 2:
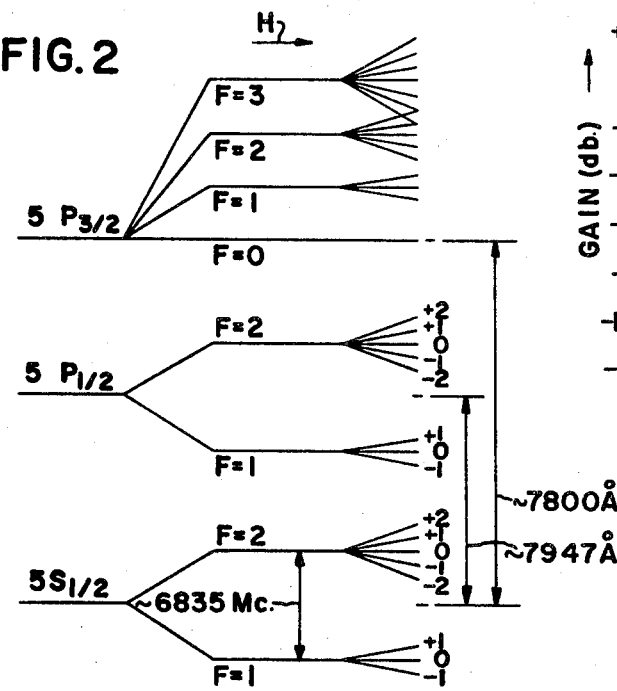
FIG. 2 is an energy level diagram of $Rb^{87}$, said diagram being not to scale.

Referring now to FIG. 2, the optical pumping mechanism which is preferred for the maser of FIG. 1 will be more fully described. The preferred pumping technique is referred to as "intensity" pumping and is described in "The Review of Scientific Instruments," vol. 35, number 7 of July 1964 at page 857 et seq. Briefly, intensity pumping comprises the use of an $Rb^{85}$ filter 5 between the $Rb^{87}$ light source 4 and ensemble to be pumped. The $Rb^{85}$ filter 5 contains a mixture of $Rb^{85}$ and argon gas at 52 torr at 20° C. and filters out certain resonance lines of the lamp 4 to produce the desired overpopulation of the $F=2$ level of the S state of the $Rb^{87}$ atoms which may then be stimulated to coherently give up their energy to the cavity resonator 1 in a self-sustaining continuous manner.

Figure 3:
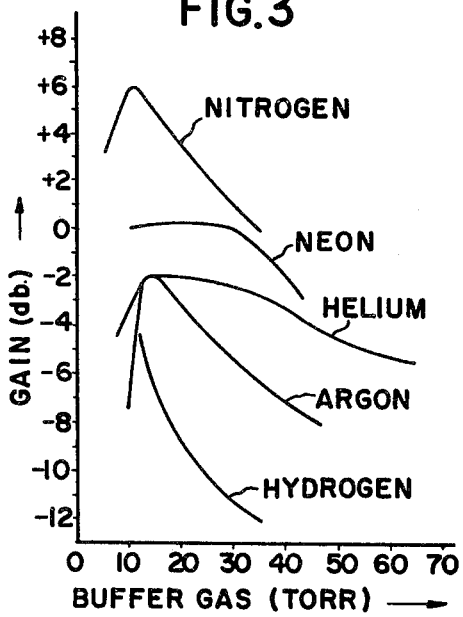
FIG. 3 is a graph of gain for $Rb^{87}$ versus buffer gas pressure for several different buffer gases.

Referring now to FIGS. 3 and 4, the effect of the quenching gas on the gain of the ensemble of $Rb^{87}$ atoms is clearly shown. It has been discovered that when nitrogen quenching gas is used as a constituent in the buffer gas for $Rb^{87}$ that within the critical range of 5-20 torr, at room temperature, the nitrogen substantially increases the gain serving to peak the gain of the ensemble at a partial pressure of nitrogen of about 11 torr, see FIG. 3. Nitrogen shows a substantial enhancement in gain as compared to other buffer gases such as neon, helium, argon or hydrogen, the gain characteristics of which are depicted in FIG. 3.

While the maximum gain was obtained for a pure quenching buffer gas, it is not a requirement that the total buffer gas be made up entirely of quenching gas. It has also been discovered that the critical partial pressure of the quenching gas may be mixed in with other gases such as neon, argon and helium. The gain characteristics of the $Rb^{87}$ atoms in the mixtures of buffer gases containing the quenching gas are shown in FIG. 4. From FIG. 4 it is seen that for buffer gas mixtures containing a partial pressure of quenching gas as a constituent within the range of 5–20 torr results in a substantial enhancement of the gain of the atomic ensemble.

The total mechanism involved in gain enhancement due to use of the quenching gas is not completely understood, however, the mechanism as it is understood is as follows: Reradiation from the excited 5P states will depopulate the $F=2$ states and so significantly reduce the pumping efficiency. Reradiation can be prevented by collisions of the second kind with buffer gas atoms. In these collisions the rubidium is de-excited by transmitting its energy to the quenching buffer gas atom. This process is referred to as quenching and is defined by the parameter L:

$$L = \frac{\text{Intensity of reradiation with buffer gas}}{\text{Intensity of reradiation without buffer gas}} = \frac{1}{1+\gamma Z_L}$$

$\tau$ = lifetime of the excited atoms,
$Z_L$ = rate of quenching collisions.

The theory and mechanism of quenching is discussed by Mitchell and Zemansky, and Pringsheim, see A. C. G. Mitchell and M. W. Zemansky, Resonance Radiation and Excited Atoms (Cambridge at the University Press, 1961), p. 192 and Peter Pringsheim, Fluorescence and Phosphorescence (Interscience Publishers, New York, 1945). Detailed quenching calculations are in most cases very complex, and the process is still not fully understood. Suffice it to say that with buffer gases such as nitrogen it seems possible to obtain almost full quenching.

Referring now to FIG. 5, there is shown a plot of gain and bandwidth versus temperature of the cavity 1; from this plot it is seen that a preferred temperature range for the cavity is approximately 60° C. This temperature yields a substantial gain at a relatively low bandwidth of the desired ($F=2$, $m=0 \rightarrow F=1$, $m=0$) transition. This desired operating temperature is maintained by oven 7.

Referring now to FIG. 6, there is shown an alternative maser cavity resonator incorporating features of the present invention. The cavity has been briefly described above but in more detail includes a hollow cylindrical main body member 21 as of stainless steel which has been plated on its interior surface with copper to provide good conductivity and hence high Q. The cavity is closed at one end by a flanged closing plate assembly 22 which is sealed in a gas tight manner to a similar flanged portion of the main body 21 via a gas tight annular gasket seal 23. The end closing plate assembly 22 includes an inwardly projecting sealing membrane 24 serving as one end wall of the cavity 1. The membrane is deformable by means of a threaded jack assembly 25 such that the cavity may be tuned over a suitable frequency range such as ±6 mc.

The other end wall of the cavity is defined by a perforated plate 26 provided with a multitude of small diameter openings such as ⅛″ in diameter. The openings are arranged such that the total transparency of the perforated end wall 26 is approximately 50%. The thickness of the end wall 26 is preferably greater than the diameter of the holes such that very little R.F. energy will leak from the cavity through the holes. The cavity main body structure 21 is sealed off in a gas tight manner at one end by means of a glass window 27 mounted across the open end of a thin wall tubular member 28 in a manner similar to a Housekeeper seal. The window assembly 27 is connected to the main body 21 in a gas tight manner by means of a pair of mating flanges 29 and a gasket 31.

A hollow cylindrical glass envelope 32 which is evacuated internally is disposed in the space between the window 27 and the perforated wall 26 to prevent undesired absorption of optical resonance radiation from the lamp 4 by the $Rb^{87}$ gas which would otherwise occupy the space between the window 27 and the perforated plate 26. In this manner efficient use of the resonance radiation is obtained.

The cavity 21 is constructed of nonreactive nonmagnetic materials which will not react with the alkali metal vapor. It has been found that suitable cavity materials include nonmagnetic stainless steel, aluminum, copper and mica. There are a great many other nonmagnetic materials which are not suitable because they react with the rubidium alkali vapor over the operating range of 20° to 80° C. Such nonsuitable materials are too numerous to mention but include Teflon, gold and various epoxy glues.

The cavity resonator 21 should have as high a Q as possible. Therefore, the microwave field supporting surfaces of the cavity 21 should have high conductivity. Copper of the nonmagnetic nonreactive materials is best suited to form such field supporting interior surfaces. Accordingly, the inside field supporting surfaces of the cavity 21 are copper plated. In a preferred embodiment of the cavity the main body 21 is formed of stainless steel for strength and the interior surfaces are copper plated. Also in a preferred embodiment the cavity Q is increased by going to a high cavity volume to surface ratio. This is achieved by dimensioning the cavity for operation on a high $Te_{0,n,m}$ mode, such as, for example, the $TE_{0,2,1}$ mode at the ($F=2$, $m=0 \rightarrow F=1$, $m=0$) transition.

Referring now to FIG. 8, there is shown a plot of resonance frequency of the maser versus temperature showing the frequency deviation of the resonance transition due to the buffer gas such as nitrogen and the frequency shift of the cavity due to thermal expansion of the cavity resonator. It has been found that in order to make the gas cell frequency standard insensitive to changes in temperature of the environment that the temperature coefficient of the resonant cavity can be off-set by a temperature coefficient of the buffer gas. More specifically, when the buffer gas is nitrogen and the cavity resonator is stainless steel, the temperature coefficients are arranged to be of the opposite sense such that they can be made to compensate each other. In this manner the maser frequency remains constant or stable over a relatively wide range of temperatures.

More specifically, the mechanism of the abovementioned temperature compensation method is as follows:

The tuned cavity and the atomic ensemble form a coupled system. If the cavity resonance frequency does not coincide with the atomic transition frequency, then the composite frequency of oscillation will not be equal to the atomic resonance frequency. This effect is described by the expression $$\nu = \nu_o + (\nu_c - \nu_o)\frac{Q_c}{Q_l}$$

where $\nu$ = oscillation frequency
$\nu_o$ = atomic transition frequency
$\nu_c$ = cavity resonance frequency
$Q_c$ = cavity "Q"
$Q_l$ = atomic line "Q"

From this formula it is seen that if the atomic transition frequency $\nu_o$ is not equal to the cavity resonance frequency $\nu_c$ that the oscillator frequency $\nu$ is not equal to, or in other words is pulled from, the atomic transition frequency $\nu_o$.

From this expression the cavity pulling is given by $$\delta\nu = (\nu_c - \nu_o)\frac{Q_c}{Q_l}$$

or $$\left(\frac{\delta\nu}{\nu}\right) = \left(\frac{\nu_c - \nu_o}{\nu_o}\right)\frac{Q_c}{Q_l}$$

In the above described Rb$^{87}$ maser $Q_c \simeq 10^4$ and $Q_1 \simeq 10^8$. Thus, $$\left(\frac{\delta\nu}{\nu}\right)_{\text{cavity}} = 10^{-4}\left(\frac{\nu_c - \nu_o}{\nu_o}\right)$$

From this if we want $$\left(\frac{\delta\nu}{\nu}\right) < 10^{-12}$$

then $(\nu_c - \nu_o) = \Delta\nu_c$ must be smaller than 68 cps.

Now examining the effect of temperature on cavity pulling.

$$\frac{d\nu}{dT} = \frac{d\nu_o}{dT} + \left(\frac{d\nu_c}{dT} - \frac{d\nu_o}{dT}\right)\frac{Q_c}{Q_1}$$

$$\frac{d\nu_o}{dT}$$

is the change with temperature of the atomic resonance frequency caused predominantly by the buffer gas.

Compensation is obtained for frequency shifts caused both by the buffer gas and cavity pulling in the following manner.

$$\left(\frac{d\nu_o}{dT}\right)_{\text{buffer gas}} = +6 \text{ cps. per } °\text{C. per cm. N}_2$$

Now $$\frac{d\nu_c}{dT}$$

is made negative and is adjusted to satisfy the following relationship:

$$\frac{d\nu_o}{dT} \sim \left(\frac{d\nu_c}{dT}\right)\frac{Q_c}{Q_1}$$

Thus at least to the first order the frequency shift due to the buffer gas cancels the frequency shift due to the cavity.

After the above compensation the cavity should be tuned to the center of the atomic line. The composite resonant frequency varies with Q and frequencies as follows:

$$\frac{d\nu}{dQ_1} = (\nu_o - \nu_c)\frac{Q_c}{Q_1^2}$$

From the above it is seen that the rate of change of the oscillation frequency with line width ($Q_1$) is zero only when the cavity is on tune ($\nu_c = \nu_o$).

In the case of the Rb$^{87}$ maser the line width or gain is not readily modified by varying the Rb pressure; however, the gain and $Q_1$ are easily changed by varying the magnetic field through the zero field condition. At zero field the effective Rb population will be highest since atoms in the $F=2$, $m_f=0$ and $F=2$, $m_f=\pm 1$ all contribute to the excess population available for maser action. At fields large enough to resolve the various hyperfine Zeeman components (some hundreds of microgauss), only the $F=2$, $m_f=0$ population will contribute to the maser action. Thus, the atomic gain is readily modified by adjusting the field from zero to a few hundred microgauss. The cavity is then tuned such that the maser frequency does not change when the field is adjusted over this range.

The atomic resonance tube apparatus, previously described, is not limited to Rb$^{87}$ atoms alone. Certain other isotopes of other metals such as, for example, thallium, sodium, potassium and cesium may be used. Any electron re-orientation transition or resonance in atoms or molecules for which the net atoms or molecules angular momentum, $j$, is an integer in quantum units of Planck's constant, $h$, may be used. In general, it is contemplated any suitable molecular or atomic beam or assemblage having desired resonance characteristics may be used. The terms "atom or atomic particle" as used herein is defined to mean molecules as well as atoms.

What is claimed is:

1. An atomic resonance apparatus including, means forming an assemblage of gaseous atoms that may be induced to undergo atomic resonance, means forming a cavity resonator surrounding said assemblage of gaseous atoms and supporting microwave electromagnetic fields that interact with said assemblage of atoms to produce resonance thereof, means for exciting and detecting resonance of said gaseous atoms, said assemblage of gaseous atoms having a certain temperature coefficient such that the atomic resonance frequency of said atoms varies in a certain first sense with variations in temperature of said assemblage of atoms, said cavity resonator being constructed, dimensioned and arranged such that it has a certain variation in resonance frequency with a temperature of a second sense which is opposite in sense to said first sense of variation in atomic resonance frequency with temperature of said assemblage of gaseous atoms, whereby the resonance frequency of the composite system including the atomic resonance gaseous medium and the cavity resonator is rendered substantially nonresponsive to temperature changes of the composite apparatus.

2. The apparatus according to claim 1 wherein said atomic resonance apparatus is an atomic maser wherein the electromagnetic fields of said cavity resonator interact with said gaseous medium to produce continuous coherent stimulated emission of radiation at the atomic resonance frequency.

3. Alkali vapor maser oscillator apparatus including, means forming an assemblage of alkali vapor atoms, said assemblage of alkali vapor atoms also including a buffer gas medium, said buffer gas medium including a quenching gas constituent at a partial pressure falling within the range of 5–20 torr at 20° C., a cavity resonator containing said assemblage of alkali vapor atoms therewithin, said cavity resonator being dimensioned and arranged with respect to said assemblage of atoms to support a microwave resonant mode of oscillation for exciting atomic resonance of said assemblage of atoms, said cavity resonator including a light transmissive portion, means forming a source of spectral resonance radiation at a spectral resonance frequency of the alkali vapor atoms of said assemblage of atoms, means for illuminating said assemblage of alkali vapor atoms with said spectral radiation by passage thereof through said light transmissive portion of said cavity for raising said assemblage of alkali vapor atoms to a nonequilibrium energy state, said assemblage of alkali atoms being provided in sufficient quantity and said cavity resonator having a sufficiently high Q such that spontaneous emission of atomic resonance microwave radiation from said assemblage of atoms induces a sufficiently strong microwave field in said cavity to interact back on said assemblage of atoms to produce coherent stimulated emission of radiation at the microwave atomic resonance frequency of said alkali vapor atoms.

4. The apparatus according to claim 3 wherein said alkali vapor atoms of said assemblage of atoms are Rb$^{87}$ and said light source of optical pumping includes a Rb$^{87}$ lamp and a Rb$^{85}$ filter for filtering out certain undesried spectral resonance lines of said Rb$^{87}$ lamp before illumination of said rubidium atoms of said assemblage of atoms whereby pumping efficiency is enhanced.

5. The apparatus according to claim 4 including means including a magnetic shield enveloping said assemblage of atoms for reducing the magnetic field intensity over said assemblage of atoms to less than 100 microgauss whereby certain Zeeman sublevels of said atomic resonance lines of said rubidium atoms are caused to combine with the field independent lines of resonance of said rubidium atoms to produce enhanced gain and maser oscillation of said rubidium atoms.

6. The apparatus according to claim 4 wherein said cavity resonator has a resonant frequency shift with temperature of opposite sense to the atomic microwave resonant frequency shift of the rubidium vapor in said buffer gas medium, whereby the resonant frequency shift of said cavity is cancelled by the resonant frequency shift of said rubidium vapor to yield a composite maser oscillation frequency which is relatively insensitive to fluctuations in temperature of the environment.

7. In a method for obtaining maser oscillations the steps of, causing an assemblage of alkali vapor atoms immersed in a buffer gas medium to be contained within a cavity resonator tuned for a resonance at the atomic resonance frequency of the alkali vapor atoms, causing the buffer gas medium to include a quenching gas constituent at a partial pressure falling within the range of 5–20 torr at 20° C., illuminating the assemblage of alkali vapor atoms with radiant energy in the optical spectrum range at a spectral resonance frequency of the alkali vapor atoms for raising said assemblage of alkali vapor atoms to a non-equilibrium energy state, causing a sufficient number of the alkali vapor atoms to be disposed within the cavity and for the cavity resonator to have a sufficiently high Q such that spontaneous emission of atomic resonance microwave radiation from the assemblage of atoms induces a sufficiently strong microwave field in the cavity to interact back on the assemblage of atoms to produce self-sustaining coherent stimulated emission of radiation at the microwave atomic resonance frequency of the alkali vapor atoms.

8. A method according to claim 7 including steps of, reducing the static magnetic field intensity over the assemblage of alkali vapor to less than 100 microgauss to cause certain of the Zeeman sublevels of the atomic resonance lines of the alkali vapor to combine with the field independent lines of the resonance of the alkali vapor to produce enhanced gain and maser oscillation of the alkali atoms.

9. A method according to claim 7 wherein the quenching gas is nitrogen.

References Cited

UNITED STATES PATENTS

| 2,955,262 | 10/1960 | Arditi | 331—3 |
| 3,038,126 | 6/1962 | Robison | 331—3 |
| 3,159,797 | 12/1964 | Whitehorn | 331—94 |
| 3,248,666 | 4/1966 | Farmer | 331—94 |

FOREIGN PATENTS

| 966,126 | 8/1964 | Great Britain. |

ROY LAKE, *Primary Examiner.*

S. H. GRIMM, *Assistant Examiner.*